United States Patent [19]

Swanson

[11] 4,441,923
[45] Apr. 10, 1984

[54] INTEGRATED PROCESS USING NON-STOICHIOMETRIC SULFIDES OR OXIDES OF POTASSIUM FOR MAKING LESS ACTIVE METALS AND HYDROCARBONS

[76] Inventor: Rollan Swanson, 220 California St., Santa Monica, Calif. 90403

[21] Appl. No.: 343,977

[22] Filed: Jan. 29, 1982

Related U.S. Application Data

[63] Continuation of Ser. No. 169,281, Jul. 16, 1980, abandoned, which is a continuation-in-part of Ser. No. 706,795, Jul. 19, 1976, abandoned, and Ser. No. 3,590, Jan. 15, 1979, abandoned.

[51] Int. Cl.³ .................. C21B 15/00; C22B 5/02; C22B 26/10
[52] U.S. Cl. ...................... 75/28; 75/20 R; 75/66; 75/67 R; 75/69; 75/71; 75/72; 75/77; 75/86; 423/414; 423/560; 423/561 A; 423/567 A; 423/641; 423/657; 585/500; 585/534; 585/638; 585/700; 585/733
[58] Field of Search ............. 423/414, 560, 561 A, 423/567 A, 641, 657, 179, 200, 203, 414; 75/28, 71, 72, 77, 86, 20 R, 66, 67 R, 69, 21, 62, 65 R; 585/500, 534, 638, 700, 733

[56] References Cited

U.S. PATENT DOCUMENTS

| | | | |
|---|---|---|---|
| 1,034,320 | 7/1928 | Specketer | 75/66 |
| 1,872,611 | 8/1932 | Thurm | 75/66 |
| 2,028,390 | 1/1936 | Hanson | 75/66 |
| 2,852,363 | 9/1958 | Adams | 75/66 |
| 3,938,988 | 2/1976 | Othmer | 75/10 R |

FOREIGN PATENT DOCUMENTS 590274 7/1947 United Kingdom .................. 75/66

OTHER PUBLICATIONS

Mellor, "A Comprehensive Treatise on Inorganic and Theoretical Chemistry", 1922, pp. 445–451.
"Comprehensive Inorganic Chemistry", Pergamon Press, 1973, pp. 371–373.

Primary Examiner—Edward J. Meros
Attorney, Agent, or Firm—Albert F. Kronman

[57] ABSTRACT

Disclosed is a combinative integrated chemical process using inorganic reactants and yielding, if desired, organic products. The process involves first the production of elemental potassium by the thermal or thermal-reduced pressure decomposition of potassium oxide or potassium sulfide and distillation of the potassium. This elemental potassium is then used to reduce ores or ore concentrates of copper, zinc, lead, magnesium, cadmium, iron, arsenic, antimony or silver to yield one or more of these less active metals in elemental form. Process potassium can also be used to produce hydrogen by reaction with water or potassium hydroxide. This hydrogen is reacted with potassium to produce potassium hydride. Heating the latter with carbon produces potassium acetylide which forms acetylene when treated with water. Acetylene is hydrogenated to ethene or ethane with process hydrogen. Using Wurtz-Fittig reaction conditions, the ethane can be upgraded to a mixture of hydrocarbons boiling in the fuel range.

13 Claims, 1 Drawing Figure

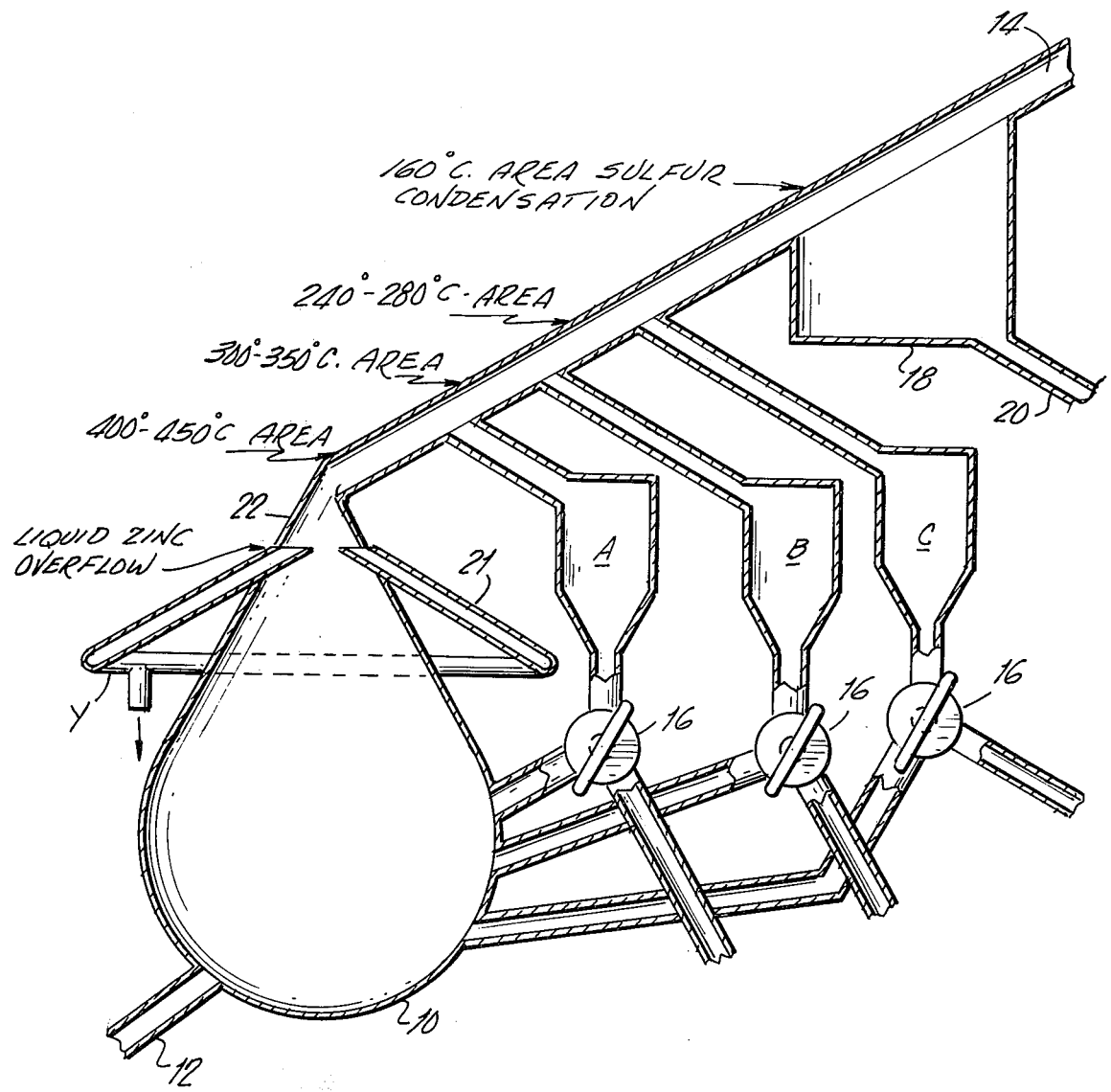

INTEGRATED PROCESS USING NON-STOICHIOMETRIC SULFIDES OR OXIDES OF POTASSIUM FOR MAKING LESS ACTIVE METALS AND HYDROCARBONS

REFERENCE TO CO-PENDING APPLICATION

This application is a continuation of application Ser. No. 169,281 filed July 16, 1980, now abandoned, which is a continuation-in-part of co-pending applications Ser. No. 706,795, filed July 19, 1976, now abandoned, and of Ser. No. 003,590, filed Jan. 15, 1979, and now abandoned.

BACKGROUND OF THE INVENTION

This invention relates to a chemical process which comprises the production of elemental potassium and the subsequent reaction of said elemental potassium with other reactants, including various metallic ores, such as those of magnesium, lead, zinc, copper, arsenic, antimony or silver to release said metals from their naturally occuring forms, in elemental state, or with water to produce potassium hydroxide and hydrogen and further reacting additional elemental potassium with said potassium hydroxide to produce more hydrogen and a thermally unstable potassium oxide which decomposes into potassium and potassium peroxide or potassium superoxide, optionally reacting said hydrogen and potassium to produce potassium hydride to store the produced hydrogen or to further react said potassium hydride with carbon to produce potassium acetylide and optionally using additional hydrogen to saturate the carbon bonds of these unsaturated compounds, utilizing process potassium or potassium hydride to catalyze the hydrogenation.

OBJECTIONS AND FEATURES OF THE INVENTION

An object of this invention is to provide a low-cost, high-yield process for producing elemental potassium from potassium oxides, or sulfides.

Another object of the invention, is the utilization of process potassium in the manufacture of carbides, acetylides, hydrogen, hydrides, hydrogen peroxide, oxygen, potassium hydroxide, less active metals, saturated and unsaturated hydrocarbons so as to provide the aforementioned products and by-products in one integrated process leading to their manufacture at lower costs than heretofore attainable.

DESCRIPTION OF PRIOR ART DISCLOSURES

There are numerous patents on techniques for producing metals from their salts and for obtaining hydrogen as a by-product. Accordingly, this background disclosure is restricted to those which are believed most relevant.

Very basic is U.S. Pat. No. 2,852,363, which describes a method for preparing potassium, cesium or rubidium by heating a hydroxide of these metals with zinc in an inert atmosphere at a temperature above the boiling point of the particular alkali metal under the pressure used in the reactor and recovering the free alkali metal. While hydrogen also is produced in that process, no suggestion is made about using it.

U.S. Pat. Nos. 1,872,611; 1,034,320; 2,028,390; 3,938,985; and British Pat. No. 590,274 also are pertinent for disclosing processes for the production of alkali metals or alloys thereof.

As will be seen hereinafter, none of these disclose, hint, or suggest in any manner whatsoever applicant's unique, novel and unobvious process.

BRIEF DESCRIPTION OF THE DRAWING

The single FIGURE accompanying this specification is a diagrammatic representation of one type of apparatus for carrying out the thermal reduction of the present process.

SUMMARY OF THE INVENTION

It has been discovered and forms the substantial conceptual basis of this invention that extraordinary process and product benefits relating to the winning of potassium and other metals and to the formation of organic products with potassium thus obtained can be achieved by the practice of this invention. Relatively low temperatures can be used in the process and high yields achieved therewith. Furthermore, the economics of the process are much improved.

Fundamentally, the invention resides in an integrated progress for producing potassium metal from its non-stoichiometric oxide or sulfide and using this metal to produce less active metals and hydrocarbons by the steps of:

1. thermally decomposing potassium oxide or sulfide substantially in the absence of water into potassium metal and to form, respectively, potassium peroxide or potassium superoxide, and potassium disulfide; and recovering the potassium metal;

2. providing a portion of the thus formed potassium in the molten or vapor state and reacting same with at least one oxide or sulfide of magnesium, copper, calcium, silver, lead, zinc, antimony, cadmium, iron, arsenic and mixtures thereof to displace the metal from said oxide or sulfide followed by recovery of said metal;

3. reacting another portion of the previously obtained potassium with water to form hydrogen and potassium oxide;

4. utilizing the previously formed hydrogen to prepare an organic compound by either:

(a) reacting said hydrogen with potassium obtained by step 1, above, at a temperature of between 250° and 300° C. to form potassium hydride, reacting said potassium hydride with carbon to form potassium acetylide and reacting said acetylide with water to produce acetylene and KOH; then hydrogenating said acetylene to form ethane and ethene; or, (b) using said hydrogen to hydrogenate carbon in the presence of a catalyst to form methane.

The organic compounds, ethane or methane, can be reacted with a halogen in manner known per se to form an alkyl halide which can then be condensed with sodium or process potassium to form hydrocarbons boiling in the fuel range under Wurtz-Fitig reaction conditions.

In subsidiary reactions, intermediate compounds are formed and recycled to produce additional potassium for reuse in the process.

DESCRIPTION OF PREFERRED EMBODIMENTS

The process of the invention comprises the following equations:

1. $K_2O \xrightarrow[350°-883°\ C./10\ mm]{} K + \frac{1}{2} K_2O_2$

2. $K + KOH \xrightarrow{360°} K_2O + \frac{1}{2} H_2$

2a. $K + \frac{1}{2} H_2O \longrightarrow KOH + \frac{1}{2} H_2$

3. $K + \frac{1}{2} H_2 \xrightarrow{<380°\ C.} KH$

4. $K_2O \xrightarrow[380°\ C.-420°\ C.]{} 1\frac{1}{2} K + \frac{1}{2} KO_2$

5. $KH + 2C \xrightarrow{<380°\ C.} KHC_2$ (in molten K)

6. $KHC_2 + H_2O \longrightarrow C_2H_2 + KOH$

7. $K + \frac{1}{2} H_2O \longrightarrow K_2O + \frac{1}{2} H_2$

8. $C_2H_2 + H_2 \xrightarrow[<65°\ C.]{K} C_2H_4 \xrightarrow[<65°\ C.]{H_2} C_2H_6$ 9. $K_2O_2 + O_2 \xrightarrow[653°\ C.-883°\ C.]{} K_2 + O_2$ 9a. $K_2O_2 \xrightarrow{779°\ C.} 2K + O_2$ 10. $K_2O_2 + 2H_2O \longrightarrow 2\ KOH + H_2O_2$ 11. $K + R_aY_b \rightarrow K_xY_x + R$. This reaction is carried out with molten potassium, at temperatures above 65° C. or with potassium vapor at temperatures above 780° C. Y is either sulfur or oxygen and R is magnesium, zinc, cadmium, lead, iron, arsenic, antimony or silver or copper.

12. $C_2H_5X + C_2H_5X + 2\ K = C_4H_{10} + 2\ KX$, wherein X is chlorine or bromine.

13. $C + 2\ H_2 \xrightarrow[250°\ C.]{Ni} CH_4$

14. $K_2S \xrightarrow{840°\ C.} K + \frac{1}{2} K_2S_2$

15. $K_2S_2 \xrightarrow{760°\ C.} K_2S + S$

16. $K_2S_3 \rightarrow K_2S + k_2S_2$ at $\frac{1}{2}$ mm Hg pressure at 360° C.

17. $K_2S + H_2O \rightarrow KOH + KHS$ Additional water gives a reversible reactions $KHS + H_2O \rightarrow KOH + H_2S$ 18. Beginning 315° C. $H_2S \rightarrow H_2 + S$ 19. $4\ K_2S_2 + 8\ H_2O \rightarrow 3K_2S + X.H_2O + K_2S_5$ (in a closed system).

20. $4\ K_2S_3 + X\ H_2O \rightarrow 2\ K_2S_5 + 2K_2S.X.H_2O$. The minimum amount of water (X) is that required to form the hydrate of potassium sulfide which exists at the temperature at which this hydrolysis occurs.

21. $4\ K_2S_4 + X\ H_2O \rightarrow 3\ K_2S_5 + K_2S.X\ H_2O$.

All of these hydrolysis decomposition reactions are carried out in a closed system and at temperatures above 60° C. and below the critical temperature of water. The minimum amount of water (x) required for these hydrolysis reactions is that which constitutes the hydrate of potassium sulfide which exists at the selected temperature or below 206° C., the melting point of $K_2S_5$.

The process of this invention utilizes the lack of thermal stability of the non-stoichiometric sulfide and oxide compounds of potassium, to produce elemental potassium and a variety of potassium compounds, thereafter utilizing this elemental potassium or some of the potassium compounds to continually reform these sulfides and oxides of potassium by reaction with water, metallic ores, etc.

Referring to the above equations: Equations 1, 4 and 14, are the basic equations of this invention, whereby elemental potassium is formed by thermal decomposition of potassium sulfide into potassium disulfide and said elemental potassium and the decomposition of potassium oxide into elemental potassium and potassium peroxide or potassium superoxide.

Equation No. 15 illustrates the decomposition of potassium disulfide into potassium sulfide and sulfur, while equation No. 16 illustrates the decomposition of potassium trisulfide, or higher polysulfide, into potassium sulfide and potassium disulfide. Equations No. 19, 20 and 21, illustrates the hot water hydrolysis of potassium polysulfide into potassium sulfide hydrate and potassium pentasulfide. The heat-reduced pressure decomposition of potassium trisulfide as illustrated in equation No. 16 are equally applicable to potassium tetrasulfide, potassium pentasulfide and potassium hexasulfide. Equation No. 6, 9 and 9a illustrate the decomposition of potassium peroxide and potassium superoxide. Potassium peroxide is decomposed into elemental potassium and elemental oxygen. Potassium superoxide ($KO_2$) is decomposed into potassium peroxide $K_2O_2$ and oxygen. At temperatures above 780° C., $K_2O_2$ begins to decompose to K and $O_2$.

Potassium does not unite with oxygen or sulfur in the absence of water vapor. Removal of water vapor from the process system will greatly reduce the tendency of potassium and either sulfur or oxygen to reunite following the thermal reduced pressure decomposition of potassium oxide or potassium sulfide.

Potassium hydroxide, potassium oxides, potassium sulfides and potassium hydrosulfides are deliquescent and have low aqueous tensions. Potassium sulfides and potassium oxides are non-stoichiometric compounds with deficiencies in the anion sub-lattice. Water, hydrogen, and even potassium hydride will substitute in the anion sub-lattice. The hydrogen is produced by the reaction of potassium metal with water vapor and the reaction with elemental potassium to produce potassium hydroxide and hydrogen. Additional potassium will react with this potassium hydroxide to form additional hydrogen and potassium oxide. In the case of the potassium oxides, water will also react directly with potassium oxide to form potassium hydroxide. At the beginning of the thermal decomposition of the potassium sulfides or oxides, the elemental potassium will react with this potassium hydroxide to form additional hydrogen and potassium oxides. At the 350° C. decomposition temperature of potassium oxide, the elemental potassium will unite with some of the hydrogen produced and form potassium hydride. As the temperature is elevated to above 380° C., potassium hydride begins to dissociate.

The elemental potassium, produced from the decomposition of potassium sulfide or potassium oxide, is soluble in the solids remaining until temperature-pressure conditions above those necessary to boil elemental potassium are reached. As shown by Equations 15-21, I have observed that potassium sulfide, prepared by the reduction of the sulfur content of potassium pentasulfide or any polysulfide with a sulfur content of two or greater, can be decomposed to elemental potassium and sulfur at 780° C. in a twenty-four hour period. Potassium pentasulfide melts at 206° C. and decomposes to potassium tetrasulfide and sulfur at temperatures beginning at 300° C. At 206° C., potassium pentasulfide melts are essentially anhydrous. Potassium tetrasulfide melts at 145° C., Potassium trisulfide melts at 279° C. and potassium disulfide melts at 470° C. Any of these compounds produce an anhydrous melt at temperatures above their melting points. It is easier to form these anhydrous melts under reduced pressure. The reduced pressures allow the water of hydration to be removed more easily to form anhydrous melts. The temperature should be at least as high as the melting point of the particular potassium polysulfide and the reduced pressures should be residual pressures of from 1 mm Hg to 50 mm Hg. As these potassium polysulfides are decomposed into lower sulfur content polysulfides, the temperature-reduced pressure conditions should be adequate to distill the sulfur. Sulfur boils at 445° C. at 760 mm Hg pressure, at 185° C. at 1 mm Hg pressure.

Potassium trisulfide decomposes to a mixture of potassium monosulfide and disulfide at 350° C. at 0.05 Torr. Potassium disulfide decomposes to potassium sulfide and sulfur at 650° C. at 0.05 Torr and anhydrous potassium sulfide decomposes to elemental potassium and sulfur at 780° C. while hydrated potassium sulfide requires 840° C. to decompose to sulfur and potassium. Without reduced pressures, potassium disulfide is the most stable union of potassium and sulfur thermally, with potassium sulfide decomposing to elemental potassium and potassium disulfide at temperatures above 780° C. for anhydrous potassium sulfide or 840° C. for hydrated potassium sulfide.

For practical purposes, the decomposition of potassium disulfide occurs at 883° C. at 10 mm Hg pressure. At this temperature pressure, potassium disulfide is rapidly decomposed into its elements. The alternate source of potassium from potassium sulfides is the decomposition of potassium disulfide into potassium sulfide at reduced pressures of 1 mm Hg at 78° C. and the subsequent decomposition of potassium sulfide into its elements under the same conditions.

Where the present process starts with potassium oxide, potassium monoxide is decomposed into elemental potassium and potassium peroxide or potassium super oxide at temperatures above 350° C., however, the potassium is not readily available for extraction from this mixture, at these temperature. At pressures of $5 \times 10^{-4}$ at 360° C. some elemental potassium can be extracted by distillation. At temperatures above the melting point of potassium peroxide, 490° C., potassium can be extracted by distillation at pressures 10 mm Hg. At temperatures of 780° C., almost all of the potassium can be extracted by distillation at 10 mm Hg. The elemental potassium decomposes into potassium peroxide and potassium and the potassium peroxide is then melted at 490° C. to make the mix anhydrous. By the removal of the water the formation of hydrides, hydroxides and hydrogen is retarded and this allows the decomposition of the potassium oxides into their elements of formation.

The potassium, produced by the present invention, is then reacted with an amount of water less than the stoichiometric amount, such as 15% less than stoichiometric, to produce potassium hydroxide and hydrogen, as shown in equation 2a. Additional potassium and the potassium hydroxide at temperatures above 360° C. will produce additional hydrogen and form the unstable potassium monoxide (equation 2). The potassium monoxide $K_2O$ is then decomposed to potassium and oxygen or potassium and potassium peroxide or potassium superoxide by one of the processes disclosed, to continuously produced hydrogen (Equation 4). A part of the potassium peroxide or potassium superoxide can be dissolved in an amount of water less than the stoichiometric amount, such as 15% less than stoichiometric to produce additional potassium hydroxide and hydrogen peroxide (Equation 10). The unstable hydrogen peroxide can then be used as a source of oxygen. Potassium superoxide and potassium peroxide can also be used as sources of oxygen at temperatures above 653° C. for the superoxide or above 780° C. for the peroxide, as shown by Equation 9 and 9A.

At any temperature above its melting point, 65° C., potassium in liquid or vapor form will reduce the ores of magnesium, copper, silver, lead, zinc, antimony, arsenic, cadmium, and mixtures thereof to the free metal and form potassium oxide or form either the sulfides or oxides of potassium by the liberation of elemental copper, silver, lead, zinc, calcium, antimony, arsenic, cadmium, etc. depending upon whether these metals were in oxide or sulfide form in their naturally occurring mixed ores or ore concentrate.

When elemental potassium has been used to form hydrogen by the decomposition of water or potassium hydroxide or by the reduction of hydrogen sulfide, derived from the decomposition of the hydrolysis product, potassium hydrosulfide, from potassium sulfide, this hydrogen may be stored as potassium hydride by reaction of said hydrogen with additional elemental potassium at temperatures between 250° C. and 360° C. Potassium hydride is miscible in molten potassium.

Potassium hydride dissolved in molten potassium reacts directly with carbon and graphite to produce potassium acetylide. Potassium acetylide reacts with water to produce acetylene.

The acetylene produced can be reacted with additional process hydrogen, utilizing molten potassium or potassium hydride as the catalyst to form ethene or ethane. The amount of hydrogen present will determine the formation of ethene or ethane. The temperature of this reaction is any temperature above the melting point of potassium, 65° C.

Hydrogen produced in the present invention can be directly combined with carbon to form methane in the presence of a suitable catalyst such as nickel at temperatures of 250° C. by the Raney-Nickel method. Elemental potassium or potassium hydride dissolved in potassium may be used as the catalyst at temperatures between 180° C. and 360° C.

EXAMPLE I

This example illustrates the preparation of potassium metal from $K_2O$ present in an ore.

In conducting this example, an ore containing 10 kg of $K_2O$ was placed in an autoclave and heated to 883° C. under a reduced pressure of 10 mm of Hg. 4.1 kg of potassium metal was distilled, leaving behind 5.9 kg of $K_2O_2$.

EXAMPLE II

This example illustrates the reactions of Equations 2-9, 11-12.

Technical grade flakes of potassium hydroxide of 90% purity were heated to 380° C. A reduced pressure of 50 mm Hg was used to dehydrate said flakes during the making of an essentially anhydrous melt.

Thereafter, the use of reduced pressures was discontinued and with the temperature maintained at 380° C., elemental potassium was added to the melt. Hydrogen was evolved. The stoichiometry was one mole of potassium hydroxide, derived from 62.2 grams of 90% technical flakes of KOH, and one mole (39.1 g) of elemental potassium.

The hydrogen evolved was passed into molten potassium maintained at 280° C. to form potassium hydride. One and one-half moles of potassium were used to take up the one mole of hydrogen and to form a liquid consisting of a solution of potassium hydride in molten potassium.

The potassium hydride solution containing one mole of KH in molten potassium was treated at 350° C. in the absence of air, nitrogen, or carbon dioxide with two moles of carbon (graphite) to form potassium acetylide.

The mixture was carefully and slowly added to one and a half mole of water to form one mole of acetylene and hydrogen as volatiles and form a solution of potassium hydroxide. The gases produced, hydrogen and acetylene, occupied 3.2 liters at 15° C. at atmospheric pressure, indicating conversion to one mole of acetylene and one-half mole of hydrogen.

The potassium oxide, formed by the reaction of potassium and potassium hydroxide, was heated to 500° C. under a reduced pressure of 10 mm Hg. After two hours of being maintained at 500° C. under 10 mm Hg., the mixture was heated to 883° C. and one and one half moles of potassium were condensed by selectively cooling the emitting gas stream in three hours and twenty minutes.

EXAMPLE III

One mole of potassium produced in Example I was treated with water as shown in Equation 2A to provide additional hydrogen gas and potassium hydroxide.

One mole of potassium superoxide produced in Example VI was added to two moles of water at 95° C. to produce one mole of hydrogen peroxide and two moles of potassium hydroxide, as illustrated by Equation 10.

This example thus shows the recovery of nearly all the potassium in the forms originally used; i.e. elemental potassium and potassium hydroxide.

EXAMPLE IV

This example shows the thermal decomposition of $K_2S$ into potassium, as shown by Equation 14.

Two pounds of $K_2S$ were heated to 780° C. under a pressure of 50 mm to remove water. The pressure was then reduced to $5 \times 10^{-4}$ at that temperature.

Sulphur was distilled and condensed in a liquid nitrogen series of traps.

When the distillation rate of sulfur decreased, the temperature was elevated to 883° C. The distillation chamber was left with potassium sulfate, identified by the barium analytical reaction, with the potassium and sulfur condensed in fresh traps cooled by liquid nitrogen. The potassium and the sulfur did not reunite in the absence of water vapor.

200 grams of potassium were collected.

EXAMPLE V

As per Equation 11, the potassium produced in Example IV was melted under 50 mm of Hg pressure and decanted from the sulfur.

The potassium was divided into four fifty gram samples and was used in its molten form.

One fifty gram sample was used to smelt 54 grams of a lead sulfide concentrate containing 73% lead. The smelting was done at 70° C. After the reaction had ceased (in approximately three minutes) the temperature was elevated to 330° C. and the molten lead was tapped from the lighter material floating on the lead surface.

One fifty gram sample was used to smelt 41.6 grams of zinc sulfide concentrate, containing 50% zinc. The temperature was 70° C. The reaction required approximately two minutes. The temperature was elevated to 440° C. and the liquid molten zinc was tapped from below the material floating on the surface of the zinc.

One fifty gram sample was used to smelt 50 grams of a copper sulfide concentrate containing 86% chalcopyrite ($CuFeS_2$). The reaction was carried out at 70° C. Iron and copper were produced. The iron was magnetically separated from the copper. The copper was melted and separated from the material floating on the copper surface.

One fifty gram sample was used to smelt 25 grams of magnesium oxide at 360° C. The reaction required six minutes. Elemental magnesium was produced.

In all of these samples, the residual potassium was distilled from the metals produced at pressures adequate to distill potassium but too low to volatilize the other metal. The three sulfide samples were separated from their carrying and largely inert gangue by dissolving the potassium sulfides produced in this smelting operation in small quantities of water. The solids were then separated from the liquid by filtration.

Sulfur was added to the filtrate and the filtrate were dehydrated at 500° C. under 50 mm Hg. pressure. The resulting anhydrous melt was then subjected to temperatures of 883° C. under 10 mm pressure to reform potassium vapor and sulfur vapor which were then condensed. This reformation of the potassium completed the cycle.

The potassium oxide produced in the magnesium smelting was directly recycled to potassium by heating the gangue and the potassium oxide to 883° C. under 10 mm Hg. Some carbon dioxide was distilled prior to the distillation of the potassium. The carbon dioxide was taken up in potassium hydroxide as it emitted the system. The potassium was largely recovered after the carbon dioxide had been removed from the system. A second sample showed that the carbon dioxide could be removed by pre-heating the magnesium oxide under reduced pressures prior to reacting same with potassium. The potassium produced by the recycling of the potassium oxides was condensed by cooling and used to smelt additional magnesium ore.

EXAMPLE VI

This example illustrates the reactions of Equation 4,5, 9-10 and 13.

Hydrogen, produced by this invention, was used to hydrogenate carbon, (graphite) at 250° C. in the presence of molten potassium (potassium hydride dissolved in molten potassium (Raney-Nickel, also can be used).

No pressures were used other than the pressure of the hydrogen issuing from the process system. A total of 100 grams of carbon was hydrogenated to methane in one-half hour by the use of one mole of potassium and one mole of potassium hydroxide by continually recycling these reagents. This recycling consisted of dissolving residual potassium oxides in water and then reacting this potassium hydroxide with potassium produced by the thermal decomposition of potassium oxides at 883° C. under 10 mm Hg (Equation 1 and 2).

A step to reduce the oxygen content of the system by decomposing any potassium superoxide that might be produced was carried out by heating the potassium oxides to 653° C. prior to decomposition at 883° C. Care was taken to condense potassium and allow the oxygen to escape the process system. This was done to avoid the production of potassium carbonyl.

The undecomposed residue was used to form potassium hydroxide and to form hydrogen peroxide by reaction with water (Equation 10). Care was taken not to allow hydrogen peroxide or any oxygen arising from the decomposition of hydrogen peroxide to enter the smelting system.

EXAMPLE VII

This example shows the production of elemental potassium and a mixture of potassium peroxide and potassium superoxide by thermal decomposition of potassium oxide; next reacting potassium peroxide and superoxide with a stoichiometric quantity of water to form potassium hydroxide and oxygen; then reacting elemental potassium with potassium hydroxide to form elemental hydrogen and to reconstitute potassium oxide for recycling.

This decomposition can be practiced in the 360° C.–380° C. temperature range with appropriate addition and withdrawal of product, over or at a temperature range below 653° C. or at a temperature of over 779° C.

In conducting this run, potassium hydroxide is heated to 370° C. in the absence of air under a reduced pressure of 1–10 MM Hg. Elemental molten potassium is slowly added to a potassium hydroxide anhydrous melt, in a 1 mole to 1 mole stoichiometric ratio. Elemental hydrogen is evolved and substantially increases the pressure within the system. Potassium will react with oxygen, nitrogen, carbon dioxide, etc. Therefore, the use of reduced pressure is necessary to reduce the reaction between molten potassium and the inert atmosphere. Neon, helium, argon, (group 8 gases) can be used in lieu of reduced pressure.

The system is opened, hydrogen is allowed to exit the process system and collected. Following the removal of the hydrogen, the reduced pressure is again employed. The potassium oxide formed during the evolution of hydrogen, is decomposed, principally by thermal means alone. The elemental potassium formed along with potassium peroxide and potassium superoxide ($K_2O_2$) is gradually distilled prior to the thermal-reduced pressure decomposition of potassium peroxide. Only the potassium is distilled. The distilled liquid/gas potassium and the hydrogen are converted into potassium hydride at temperatures below 380° C. under atmospheric pressure or super-atmospheric pressure.

Following removal and separation of hydrogen and potassium, an amount of water less than the stoichiometric amount, such as 15% less than stoichiometric potassium peroxide ($KO_2$) to form potassium hydroxide and oxygen. This oxygen is separately removed from the process system. The hydrogen, potassium are separated from the process system separately from the oxygen removed.

The surplus of elemental potassium removed from the system above that predicted from the formation of potassium peroxide $KO_2$ indicates that some potassium superoxide $K_2O_2$ has been formed.

The potassium and the potassium hydride are again reacted with water to form additional hydrogen.

1 M (56.11 Grams) of potassium hydroxide (85–86% purity) was brought to 380° C. under 10 MM pressure. Water was distilled as progressively lower potassium hydroxide hydrates were formed. A solid potassium hydroxide then melts at 360° C.±5° C. One mole elemental potassium was melted under an argon atmosphere and added drop by drop to the melt of potassium hydroxide.

When the evolution of hydrogen increased the pressure of the evacuated system to atmospheric or super-atmospheric pressure, the system is opened and hydrogen is exited from the system. When the hydrogen has been removed, as evidenced by the stabilizing of system pressure at slightly above atmospheric reduced pressure is again used preferably at approximately 1 MM Hg. Elemental potassium is distilled from the system. Slightly over one mole of potassium is distilled.

The elemental potassium is reacted with the hydrogen at temperatures between 260° C.–380° C. to form solid potassium hydride. Potassium hydride is soluble is excess molten potassium.

Slightly less than 1 M of water is added to the mix. The amount of water is reduced below 1 M by the same ratio that excess potassium had been removed from the system, to the potassium peroxide-superoxide remaining in the reaction vessel. Oxygen is evolved and potassium hydroxide is formed.

EXAMPLE VIII

This example shows the high temperature production of hydrogen. In conducting this run, one mole of commercial potassium hydroxide is heated to 779° C. under reduced pressure or under an inert gas atmosphere (helium, neon, argon, etc.).

Water is removed as the series of potassium hydroxide hydrates contained therein is decomposed to lower hydrates with the rise in temperature. At 360° C.±5° C., potassium hydroxide forms an anhydrous melt.

Additional water, above that of the hydrates, is given off by the partial thermal decomposition of potassium hydroxide to potassium oxide and water. Above 360° C.±5° C., there is a progressive decomposition of potassium oxide to potassium peroxide and elemental potassium.

The potassium thus produced reacts with the water vapor to form potassium hydroxide and water and with potassium hydroxide to form hydrogen and potassium oxide (Equations 20 and 21).

An equilibrium is reached when approximately 13% of the potassium and hydrogen have been distilled. Thereafter the decrease of the hydrogen content of the process system allows further decomposition of the potassium hydroxide-potassium oxide-potassium peroxide to potassium without recombining of potassium with oxygen due to the diminished water content of the system.

88% of the potassium is recovered in 2½ hours and about 88% of the hydrogen is also recovered.

The reaction time is accelerated to 1 hour by the addition of ½ Mole of potassium to the anhydrous melt of potassium hydroxide.

EXAMPLE IX

One mole of hydrogen produced as above indicated was reacted with the acetylene produced at 360° C. to form ethene. A second mole of hydrogen was supplied to hydrogenate the ethene to ethane.

One mole of ethane was reacted in the gaseous phase with one mole of chlorine to form ethyl chloride. The ethyl chloride was collected and reacted with potassium by refluxing in absolute ether under Wurtz-Fittig Reaction conditions to form butane. The butane thus produced was reacted in the same manner with chlorine gas to form butyl chloride which in turn was reacted with potassium metal produced as above indicated also under Wurtz-Fitting Reaction conditions to form hydrocarbons having octane ratings suitable for use in internal combustion engines.

Suitable apparatus for carrying out the present process as shown in the drawing comprises a melting chamber or retort 10 made of corrosion resistant metal or alloy such as nickel or tungsten metal which can be heated under reduced pressure. A tap 12 for molten metal is formed or secured at the bottom of the chamber. A vacuum line 14 connects the chamber to a pump (not shown) capable of exhausting the chamber to a pressure of ½ to 26 mm Hg. pressure. Connected between the chamber and the vacuum line 14 are three traps A,B,C, for condensing and returning reformed oxides or sulfides and elemental condensed alkali metal to chamber 10 through stopcocks 16. A fourth trap 18 is provided remote from melting chamber 10 for collection of sulfur which can be removed through outlet 20. Suitable means (not shown) are provided on or around the melting chamber 10 to heat it up to 680° C. and the areas remote from the chamber to gradually decreasing temperatures of 450° C. to 160° C.

A ring 21 fitted within slot 22 is provided on the metal chamber 10 to pick up metal from condensed vapors passing through the vacuum line 14.

It is to be understood that the foregoing specific examples are presented by way of illustration and explanation only and that the invention is not limited by the details of such examples.

The foregoing is believed to so disclose the present invention that those skilled in the art to which it appertains can, by applying thereto current knowledge, readily modify it for various application. Therefore, such modifications are intended to fall within the range of equivalence of the appended claims.

What I claim is:

1. An integrated process for producing potassium from its non-stoichiometric oxide or sulfide and subsequently using the potassium produced to obtain less active metals and hydrocarbons, comprising the combination of steps of:
   1. thermally decomposing potassium oxide or potassium sulfide substantially in the absence of water thereby obtaining potassium metal, and, respectively potassium peroxide or potassium super oxide, and potassium disulfide; recovering said potassium metal from the aforesaid other products;
   2. providing a portion of the previously obtained potassium metal at a temperature above its melting point in the molten or vapor state; reacting said potassium with at least one oxide or sulfide of magnesium, copper, calcium, silver, lead, zinc, antimony, cadmium, iron, arsenic and mixtures thereof to displace the metal from said oxide or sulfide and recovering the thus displaced less active metal from residual potassium or potassium compounds;
   3. reacting another portion of the previously obtained potassium with water to form hydrogen, potassium oxide and potassium hydroxide;
   4. utilizing a portion of said hydrogen obtained in Step 3 to prepare a hydrocarbon by either:
      (a) reducing said hydrogen with potassium metal obtained in step 1, above, at a temperature of between 250° C. and 300° C. to form potassium hydride, next reacting said potassium hydride with carbon to form potassium acetylide, synthesizing acetylene and KOH by contacting said acetylide with water; hydrogenating said acetylene to ethene and ethane with hydrogen obtained in step 3, above, or
      (b) using said hydrogen to hydrogenate carbon in the presence of a hydrogenation catalyst to form methane.

2. The process of claim 1 in which the hydrogenation catalyst consists of a portion of the potassium obtained in step 1 and the hydrogenation temperature ranges from 180° to 360° C.

3. The process of claim 1, comprising the further step(s) of treating a portion of the potassium obtained in step 1 with water to form hydrogen.

4. The process of claim 1, comprised by the further steps of reducing a portion of potassium obtained in step 1 with potassium hydroxide produced in step 3 thereby forming potassium oxide and hydrogen for reuse in the process.

5. The process of claim 1, wherein the potassium oxide in step 1 is heated to above 350° C. under a pressure from 10 mm Hg to atmospheric.

6. The process of claim 1, wherein the sulfide produced in step 1 is heated to about 650° C. under reduced pressure to form potassium sulfide and sulfur.

7. The process of claim 1 wherein the potassium sulfide is recycled to step 1.

8. The process of claim 1, wherein the potassium sulfide is reacted with water to form potassium hydroxide and potassium hydrosulfide.

9. The process of claim 1, wherein the hydrogen produced in step 3 is dissolved in molten potassium metal obtained in step 1 for storage and later utilization in said process.

10. The process of claim 1, wherein lead sulfide is reacted with a portion of potassium metal obtained in step 1, the temperature is increased to about 330° C. and molten lead is recovered by tapping from lighter material floating on the surface of the system.

11. The process of claim 1, wherein zinc sulfide is reacted with a portion of the potassium metal obtained in step 1 and that thereafter the temperature is increased to about 440° C. and that zinc metal is tapped from material floating on the surface of the system.

12. The process of claim 1, wherein chalcopyrite is reacted with a portion of the potassium metal obtained in step 1 at about 70° C. to produce iron and copper and then magnetically separating the iron from said copper.

13. The process of claim 1, wherein the magnesium oxide is reacted with a portion of the potassium metal obtained in step 1 at about 360° C. and elemental magnesium is recovered by distilling residual potassium.

* * * * *